US012355231B2

United States Patent
Nemiroff et al.

(10) Patent No.: US 12,355,231 B2
(45) Date of Patent: Jul. 8, 2025

(54) OVERVOLTAGE AND SLOW CLOCK GLITCH DETECTION

(71) Applicant: Intel Corporation, Santa Clara, CA (US)

(72) Inventors: Daniel Nemiroff, Folsom, CA (US); Carlos Tokunaga, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 17/667,799

(22) Filed: Feb. 9, 2022

(65) Prior Publication Data
US 2023/0253779 A1    Aug. 10, 2023

(51) Int. Cl.
*H02H 3/24* (2006.01)
*H02H 1/00* (2006.01)

(52) U.S. Cl.
CPC ............ *H02H 3/24* (2013.01); *H02H 1/0007* (2013.01)

(58) Field of Classification Search
CPC ...... H02H 3/24; H02H 1/0007; G06F 21/755; G06F 21/81; G06F 21/552
See application file for complete search history.

(56) References Cited

U.S. PATENT DOCUMENTS 8,296,597 B2 * 10/2012 Tu ............................ G06F 1/324
713/340
2019/0095564 A1 * 3/2019 Atsatt ................. H03K 19/1776

OTHER PUBLICATIONS

IEEE Xplore Digital Library [online]. Tschanz "Tunable replica circuits and adaptive voltage-frequency techniques for dynamic voltage, temperature, and aging variation tolerance" Retrieved on 2009. Retrieved from the Internet: <https://ieeexplore.ieee.org/stamp/stamp.jsp?tp=&arnumber=5205410> (Year: 2009).*
Nemiroff "Tunable Replica Circuit for Fault-Injection Detection" Retrieved on 2022. Retrieved from the Internet: <https://i.blackhat.com/USA-22/Wednesday/US-22-Nemiroff-Fault-Injection-Detection-Circuits.pdf> (Year: 2022).*

* cited by examiner

*Primary Examiner* — Jared Fureman
*Assistant Examiner* — Nicolas Bellido
(74) *Attorney, Agent, or Firm* — NICHOLSON DE VOS WEBSTER & ELLIOTT LLP

(57) ABSTRACT

An apparatus, system, and method for are provided. A device includes a first tunable replica circuit configured to detect an undervoltage and overclocking event, a second tunable replica circuit configured to detect an overvoltage and underclocking event, and a countermeasures component configured to alter a circuit of the device responsive to detection of the undervoltage and overclocking event or the overvoltage and underclocking event.

20 Claims, 10 Drawing Sheets

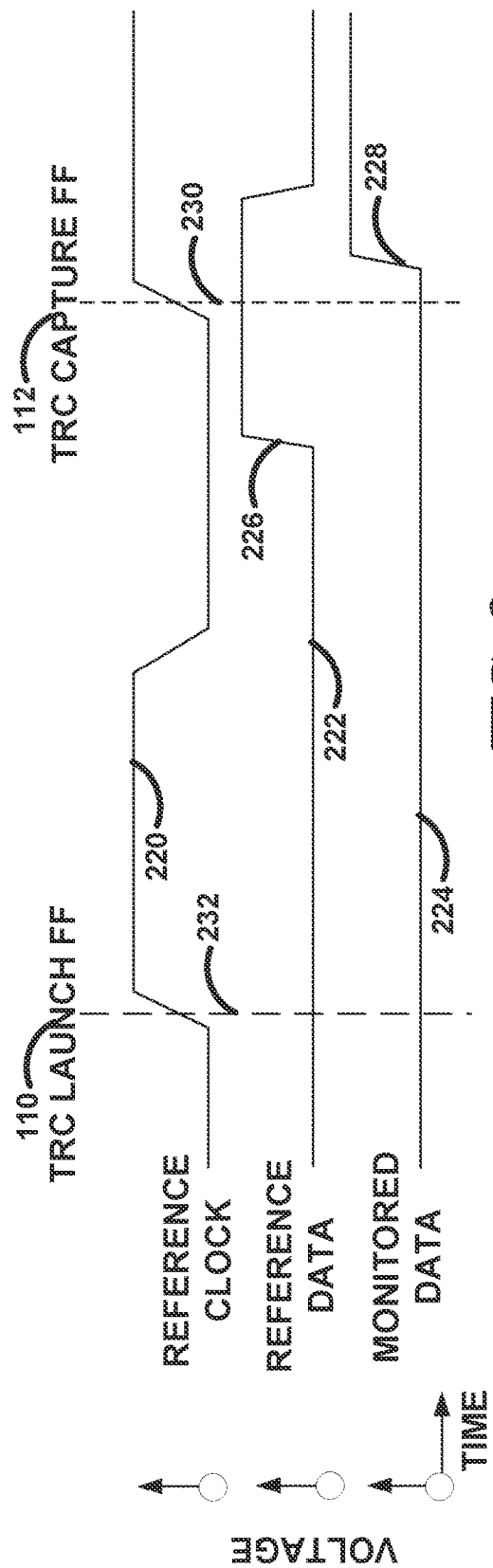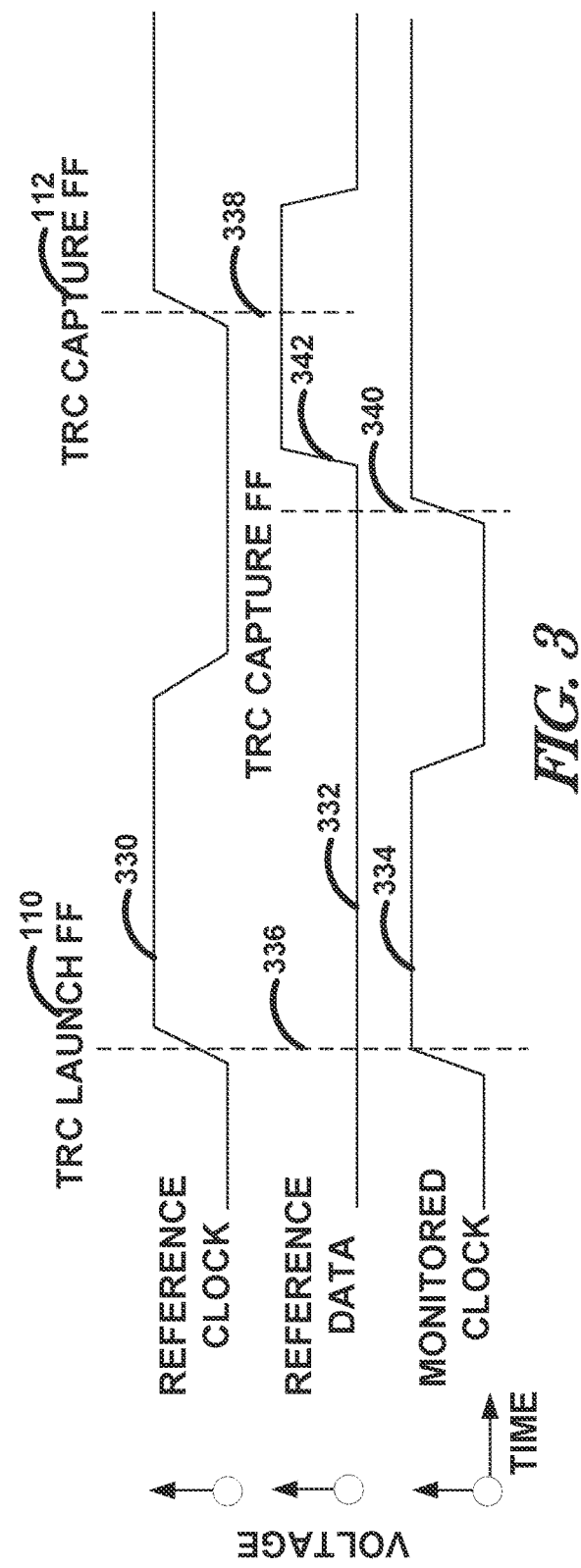

OVERVOLTAGE AND SLOW CLOCK GLITCH DETECTION

TECHNICAL FIELD

Embodiments pertain to device security. Some embodiments relate to detecting a glitch that either raises a voltage or lowers a clock speed to a rate that causes an undetected timing violation.

BACKGROUND

Various components use an analog voltage monitor, an analog clock monitor, or a combination thereof, to detect an overvoltage or slow clock. Analog voltage monitors consume a large amount of space in silicon and are difficult to port. Similarly, analog clock monitors consume a large amount of space in silicon and are difficult to port. Further, the analog voltage monitor, and the analog clock monitor are ultimately not monitoring what an attacker is seeking to change in their attack.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 2 illustrates, by way of example, a graph of voltage versus time for some TRC signals and a monitored signal that help explain undervoltage glitch detection.

FIG. 3 illustrates, by way of example, graphs of voltage versus time for some TRC signals and a monitored signal that help explain fast clock glitch detection.

DETAILED DESCRIPTION

Figure 1A:
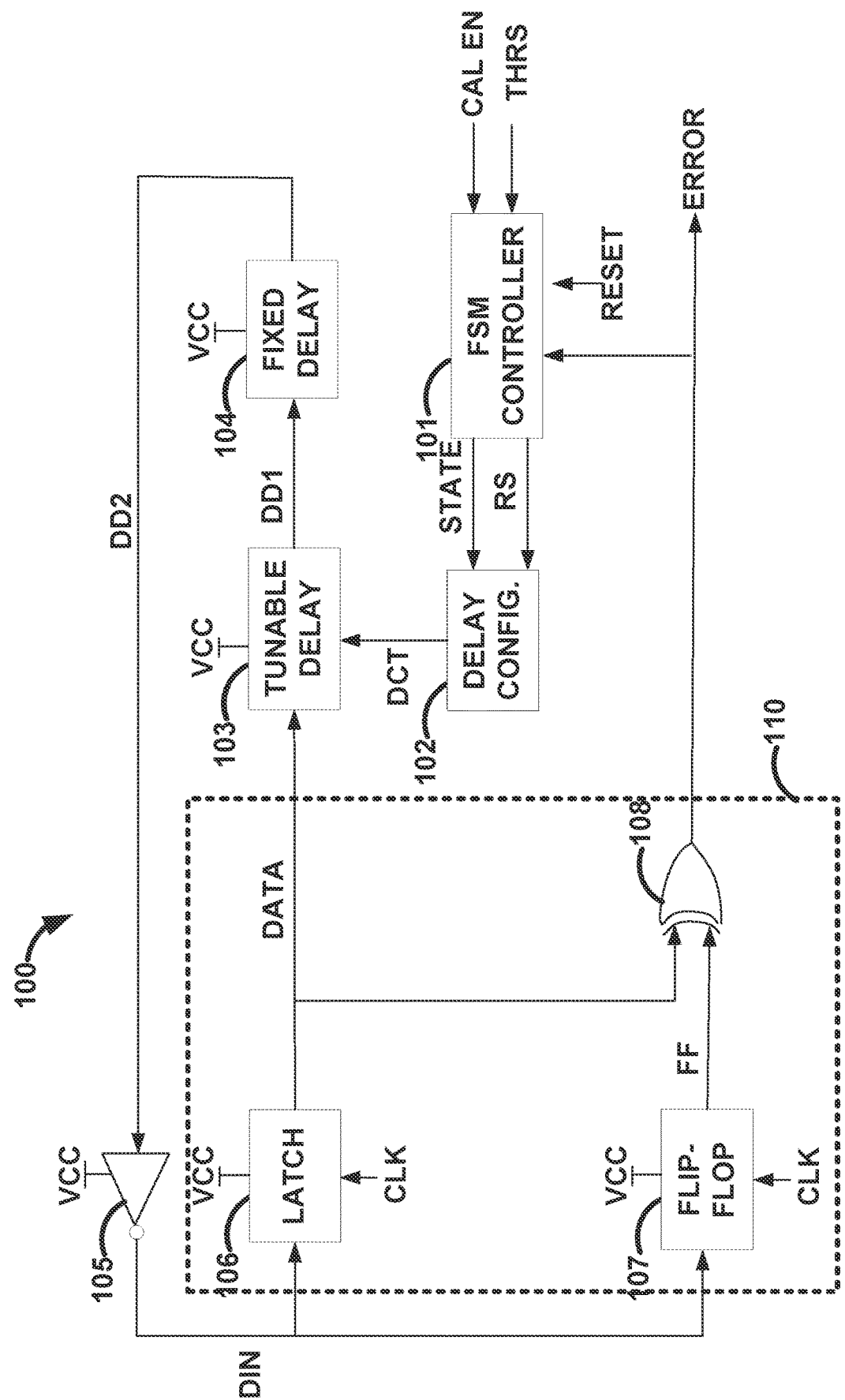
FIG. 1A illustrates, by way of example, an embodiment of a voltage attack detection circuit.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A voltage detection circuit includes a tunable delay circuit that receives a supply voltage and that generates a delayed signal in response to an input signal. A control circuit causes a first adjustment in a delay provided by the tunable delay circuit to the delayed signal. An error detection circuit generates an error indication in an error signal in response to a change in a timing of the delayed signal relative to a clock signal caused by the first adjustment in the delay provided to the delayed signal. The control circuit causes a second adjustment in the delay provided by the tunable delay circuit to the delayed signal in response to the error indication. The error detection circuit causes the error signal to be indicative of the supply voltage reaching a threshold voltage after the second adjustment in the delay.

A prior tunable replica circuit (TRC) is designed to only detect undervoltage and overclocking fault-injection glitch attacks. Embodiments provide a TRC that additionally detects overvoltage and underclocking attacks as well. The TRC of embodiments provides additional protection making circuits that include the TRC more secure.

The TRC detects setup time violations by a driving a latch, tunable-replica circuit, and a receiving FF. The receiving FF ultimately detects when the data being driven arrives after the clock fed into the receiving FF as shown below as a result of either an undervoltage or overclocking attack.

However, the existing TRC solution cannot detect an attack (illustrated below) that results from an overvoltage or underclocking attack. In such an attack the data has been sped up significantly such that it arrives one cycle too early, the opposite of an undervoltage/overclocking attack. This speed up of the data is done by the attacker increasing voltage or slowing down the clock. The results, from a security point-of-view, is that data is latched too early. Possible exploits occur because invalid instructions or address is latched into a processor.

Embodiments invert the behavior of the existing TRC (which originally only supports undervoltage and overclocking detection). Specifically, instead of the TRC capture FF generating an error when the data arrives after the clock by a specified amount of time, the FF generates an error when the clock arrives after the data by a same or different specified amount of time.

Instead of adding logic circuitry to the existing TRC circuit to give it a dual role in detecting both overvoltage/underclocking attacks and undervoltage/overclocking attacks embodiments place at least some of the changes in a security engine containing the TRC. The security engine, or other component, can instantiate two TRCs, one to detect each type of attack (undervoltage/overclocking and overvoltage/underclocking). This instantiation includes all the supporting logic for the TRC such as calibration fuses, calibration finite state machine, or the like.

The TRC and security engine logic dedicated to overvoltage/underclocking can have a following inverted property: instead of generating an error when timing is violated (as is the case with the existing TRC), this instantiation of the TRC generates an error when timing is met by means of an inverter. This can be accomplished by:

1. In calibration of the overvoltage/underclocking TRC define a trip point for "meeting timing" when the time between the data change (going from low ("zero") to high ("one") or high to low) and clock change is greater than or equal a specified time (which is equivalent to a voltage level (Vmax) as is explained elsewhere).
2. The output of the overvoltage/underclocking TRC is inverted by the so the countermeasures are invoked when timing of the overvoltage/underclocking TRC is met.
3. The undervoltage/overclocking TRC is calibrated to generate an error when timing fails at a point below Vmin (which is equivalent to a specified time between clock arrival and data arrival).
4. The overvoltage/underclocking TRC can output a "valid" signal to the security engine to qualify the error output from the TRCs. This valid signal helps because cycles from the TRC to the security engine is to be latched every-other cycle because the falling cycle will not be valid for an over-voltage attack.

According to some embodiments, a voltage attack in a circuit can be detected using a tunable delay circuit, an error detection sequential circuit, and a control circuit that operates from the same supply voltage as the logic circuitry being monitored and protected. The tunable delay circuit delays an output signal of the error detection sequential circuit to generate a delayed signal. The tunable delay circuit receives a supply voltage. The control circuit causes first adjustments to a delay provided by the tunable delay circuit to the delayed signal in response to an enable signal. The error detection sequential circuit generates an indication of an error in an error signal in response to a change in a timing of the delayed signal relative to a clock signal that is caused by at least one of the first adjustments in the delay provided to the delayed signal. The control circuit causes a second adjustment to the delay provided by the tunable delay circuit to the delayed signal in response to the indication of the error in the error signal and based on a regress value indicated by a control input. The error detection sequential circuit generates an attack indication in the error signal when the supply voltage has reached a threshold voltage after the second adjustment to the delay. The threshold voltage may, as an example, be calculated by adding or subtracting a regress voltage determined based on the control input from a nominal supply voltage.

FIG. 1A illustrates, by way of example, an embodiment of a voltage attack detection circuit 100. The voltage attack detection circuit 100 of FIG. 1A includes a self-calibrating tunable replica circuit (SC-TRC), as will be described in further detail below. As shown in FIG. 1A the voltage attack detection circuit 100 includes finite state machine (FSM) controller circuit 101, delay configuration circuit 102, tunable delay circuit 103, fixed delay circuit 104, inverter circuit 105, latch circuit 106, flip-flop circuit 107, and XOR logic gate circuit 108. Latch circuit 106, flip-flop circuit 107, and XOR logic gate circuit 108 are part of an error detection sequential (EDS) circuit 110.

Figure 1B:
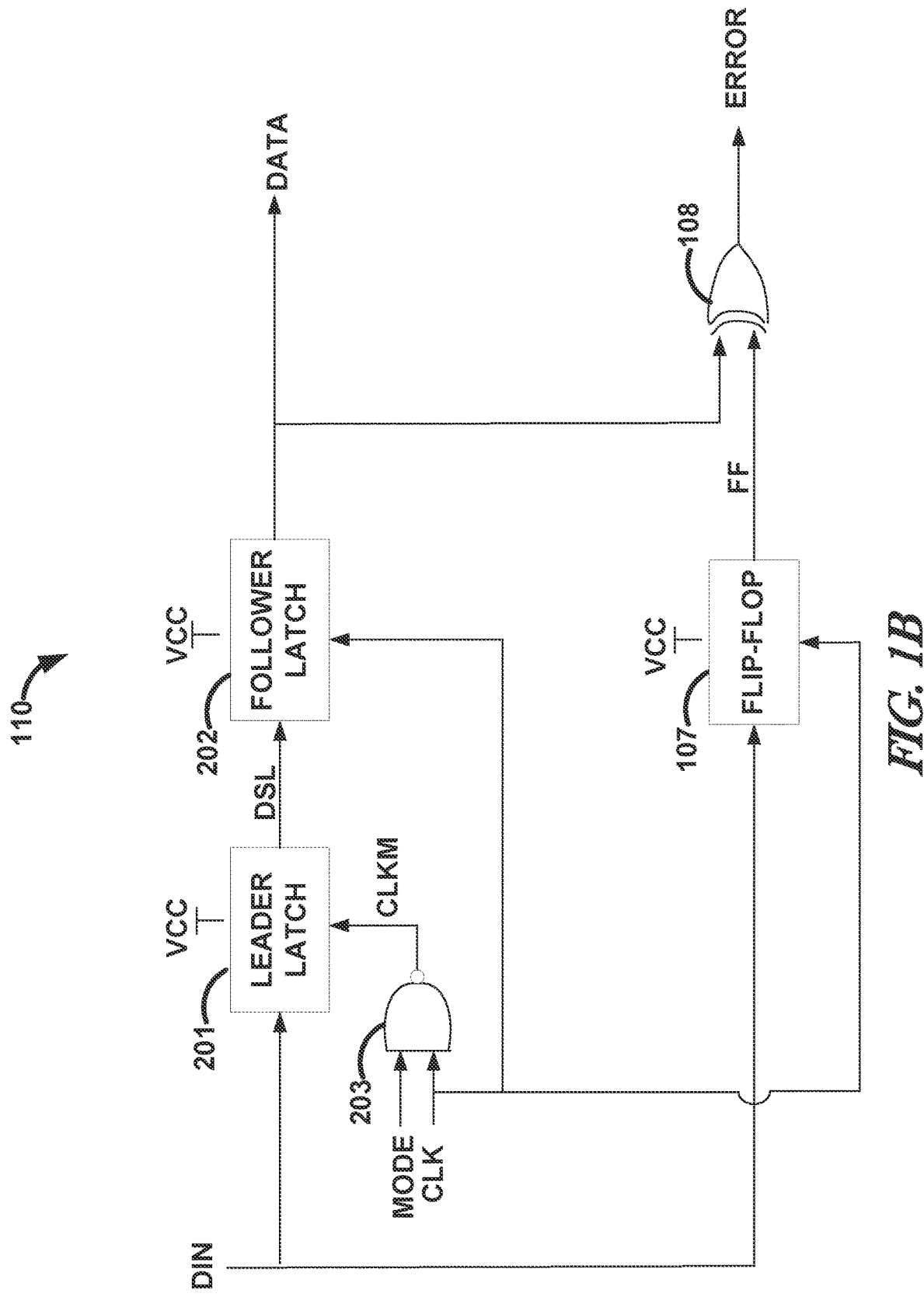
FIG. 1B illustrates further details of an error detection sequential (EDS) circuit of FIG. 1A, according to an embodiment.

FIG. 1B illustrates further details of the error detection sequential (EDS) circuit 110 of FIG. 1A, according to an embodiment. As shown in FIG. 1B, EDS circuit 110 includes a leader latch circuit 201, a follower latch circuit 202, a NAND logic gate circuit 203, flip-flop circuit 107, and XOR logic gate circuit 108. The circuitry shown in FIGS. 1A-1B may be provided in any type of integrated circuit (IC), such as a programmable logic IC, a microprocessor IC, a graphics processing unit (GPU) IC, or an application specific IC. As a specific example that is not intended to be limiting, circuit 100 can be built using unused lookup table primitives in a reconfigurable field programmable gate array (FPGA) to create a dynamic and opportunistic resource-aware security sensor.

FSM controller circuit 101 and delay configuration circuit 102 function as a delay control circuit that controls the adjustable delay of tunable delay circuit 103, as described in detail below. As shown in FIG. 1A, a reset signal RESET, a calibration enable signal CALEN, and threshold regress control signals THRS are provided to inputs of the finite state machine (FSM) controller circuit 101. An error signal ERROR from the output of the XOR logic gate circuit 108 is provided to an additional input of FSM controller circuit 101.

FSM controller circuit 101 generates output signals STATE that indicate the current state of a finite state machine (FSM) in the FSM controller circuit 101. FSM controller circuit 101 adjusts the current state of the FSM based on the input signals provided to FSM controller circuit 101. The STATE signals are provided to inputs of delay configuration circuit 102. Delay configuration circuit 102 generates delay code tuning signals DCT based in part on the state of the FSM indicated by the STATE signals. The delay code tuning signals DCT may include one or more signals (bits). Delay configuration circuit 102 may include an encoder that generates encoded delay code tuning signals DCT based on the state indicated by the STATE signals. The encoder may, as specific examples that are not intended to be limiting, encode the delay code tuning signals DCT as a binary code, a thermometer code, a Gray code, or a one-hot code.

Tunable delay circuit 103, fixed delay circuit 104, inverter circuit 105, and latch circuit 106 are coupled together in a loop to form a clock divide by two circuit, which is now described in further detail. The delay code tuning signals DCT are provided to control inputs of tunable delay circuit 103. Tunable delay circuit 103 is an adjustable delay circuit.

Tunable delay circuit 103 delays a digital input signal DATA to generate a delayed digital output signal DD1. The delay that the tunable delay circuit 103 provides to the delayed output signal DD1 relative to input signal DATA is set based on the value of the delay code tuning signals DCT. Tunable delay circuit 103 adjusts the delay provided to delayed signal DD1 relative to signal DATA based on changes in the value of the delay code tuning signals DCT. A supply voltage VCC is provided to each of the delay cell circuits in tunable delay circuit 103. The circuitry in tunable delay circuit 103 is powered by the supply voltage VCC.

Tunable delay circuit 103 may, for example, be a replica circuit that replicates the delay in some other part of the same integrated circuit (IC). The tunable delay circuit 103 may, for example, replicate the delay in a data path in the IC and be in physical proximity to the data path. According to a more specific example, the data path that is replicated by delay circuit 103 may be the critical timing path in logic circuitry that is being monitored by voltage attack detection circuit 100. The logic circuitry, including the data path, receives the same supply voltage VCC as voltage attack detection circuit 100. The tunable delay circuit 103 may, for example, replicate the delay in the data path by containing the same types of logic gates connected in the same order as the data path, or by using different types of logic gates that are selected to replicate the delay of the data path.

The delayed output signal DD1 of tunable delay circuit 103 is provided to an input of fixed delay circuit 104. Fixed delay circuit 104 delays the delayed signal DD1 to generate a second delayed digital output signal DD2. The delay that fixed delay circuit 104 provides to the delayed output signal DD2 relative to the delayed input signal DD1 is not adjustable based on a control input. However, the delay that fixed delay circuit 104 provides to the delayed output signal DD2 relative to the delayed input signal DD1 may vary based on process, voltage, and temperature (PVT) variations of the integrated circuit. The supply voltage VCC is also provided to each of the delay circuits in fixed delay circuit 104.

The delayed output signal DD2 is provided to an input of inverter circuit 105. Inverter circuit 105 inverts signal DD2 to generate an inverted digital output signal DIN. Inverter circuit 105 causes the logic state of signal DIN to be the logical inverse of the logic state of signal DD2. Signal DIN is provided to data inputs of latch circuit 106 and flip-thy circuit 107, as shown in FIG. 1A. Latch circuit 106 is an asynchronous bi-stable multi-vibrator circuit. Latch circuit 106 causes the current logic state of signal DIN to propagate to its output as digital signal DATA while an input clock signal CLK is in a first logic state. Signal DATA is provided to an input of tunable delay circuit 103. The inversion provided to signal DIN by inverter circuit 105 causes signals DIN, DATA, DD1, and DD2 to continuously oscillate between binary logic states in the clock divide by two circuit. Thus, signals DIN, DATA, DD1, and DD2 are periodic signals. Latch circuit 106 may function as a clock frequency divider circuit. Latch circuit 106 may, for example, cause signal DD2 to have one-half the frequency of the clock signal CLK, such that latch circuit 106 functions as a clock divide-by-2 circuit.

Referring to FIG. 1B, a MODE signal and the clock signal CLK are provided to inputs of the NAND logic gate circuit 203. NAND logic gate circuit 203 performs a NAND Boolean logic function on the logic states of clock signal CLK and the MODE signal to generate the logic state of an output clock signal CLKM that is provided to a clock input of leader latch circuit 201. The clock signal CLK is also provided to clock inputs of follower latch circuit 202 and flip-flop circuit 107. During an error detection mode of circuit 100, the MODE signal is set to a logic low state (i.e., MODE=0) to cause the leader latch circuit 201 to be transparent to signal DIN. Thus, when the MODE signal is in a logic low state, the NAND logic gate circuit 203 causes the clock signal CLKM to remain in a logic high state. When clock signal CLKM remains in a logic high state during the error detection mode (i.e., when the MODE signal is low), leader latch circuit 201 continuously causes the current logic state of signal DIN to propagate to the data input of follower latch circuit 202 as signal DSL. In normal leader-follower mode, the MODE signal is in a logic high state (i.e., MODE=1), and NAND logic gate circuit 203 provides inverted logic transitions in clock signal CLK to clock signal CLKM.

Follower latch circuit 202 causes the current logic state of the output signal DSL of the leader latch circuit 201 to propagate to its output as digital signal DATA while the input clock signal CLK is in a first logic state (e.g., a logic high state). Follower latch circuit 202 prevents the current logic state of signal DSL from propagating to its output as signal DATA while clock signal CLK is in a second logic state (e.g., a logic low state).

Flip-flop circuit 107 is a synchronous bi-stable multi-vibrator circuit. Flip-flop circuit 107 captures the logic state of signal DIN and passes the captured logic state of signal DIN to its output in signal FF only on each logic state transition in the clock signal CLK that occurs in a predefined direction. For example, flip-flop circuit 107 may capture and pass the logic state of signal DIN to signal FF only on each rising edge of the clock signal CLK. Alternatively, flip-flop circuit 107 may capture and pass the logic state of signal DIN to signal FF only on each falling edge of the clock signal CLK.

The output signal DATA of latch circuit 106 and the output signal FF of flip-flop circuit 107 are provided to inputs of XOR logic gate circuit 108. XOR logic gate circuit 108 performs an XOR Boolean logic function on the current logic states of signals DATA and FF to generate the logic state of its output signal ERROR. As mentioned above, the output signal ERROR of XOR logic gate circuit 108 is provided to an input of FSM controller circuit 101. The ERROR signal may also be provided as an output of circuit 100.

As discussed above, the tunable delay circuit 103 of FIG. 1A may, in an example embodiment, be a replica data-slice circuit that replicates the delay in a data path in the same IC and be in physical proximity to the replicated data path. The replica data-slice circuit and the data path receive the same supply voltage VCC. In this example embodiment, the digital code indicated by the delay code tuning signals DCT at the point of first failure is indicative of the speed grade of the integrated circuit (IC) for a particular supply voltage VCC and clock frequency (V, F) pair, because the tunable delay circuit 103 is derived from the replica data-slice and is in physical proximity to the actual data path. As a specific example, in a fast integrated circuit die, the delay code tuning signals DCT may indicate a larger digital code at the point of first failure (POFF), because a larger number of delay cells are used to reach the POFF. As another example, in a slower integrated circuit die, the delay code tuning signals DCT may indicate a smaller code at the POFF, because a smaller number of delay cells are used to reach the POFF. In this embodiment, the delay code tuning signals DCT can be used to sort integrated circuit dies after fabrication based on their speed using frequency driven silicon binning.

The digital code indicated by the delay code tuning signals DCT at the point of first failure is dependent on the process, the voltage, and the temperature (PVT) of the IC. For this reason, the digital code indicated by the delay code tuning signals DCT at the point of first failure is a valuable reference point for security uses, such as power optimization and energy recovery using dynamic voltage and frequency scaling. When a voltage attack detection circuit 100 is embedded inside an integrated circuit (IC), the tunable delay circuit 103 tracks the PVT conditions of the IC during operation of the IC. Transient voltage and temperature changes in the IC, if any, may be indicated by changes in the delay of tunable delay circuit 103 and by changes in the ERROR signal, particularly when transitions in the DIN signal occur close to (or after) a transition in the clock signal. The periodicity of the ERROR signal is also an excellent indicator of the extent of timing violations and the timing margin recovery. Multiple instances of circuit 100 can be created to implement a network of compact voltage sensors in an IC to diagnose the conditions of the supply voltage power grid in the IC, to indicate voltage faults in the IC, and to flag voltage attacks on the IC for making the IC more secure. Voltage attack detection circuit 100 can also be used to maximize the supply voltage VCC and timing guard bands and to improve silicon energy efficiency in a dynamic, workload dependent manner.

FIG. 2 illustrates, by way of example, a graph of voltage versus time for some TRC signals and a monitored signal that help explain undervoltage glitch detection. A reference clock signal 220, reference data signal 222, and monitored data signal 224 are illustrated in the graph of FIG. 2. An undervoltage event occurs when the monitored data signal 224 lags reference clock signal 220 by more than a specified amount of time. A TRC launch FF 110 starts timing at a rising edge of the reference clock signal 220 (indicated by event 232). A TRC capture FF 112 sets a time which data is expected to arrive indicated by capture event 230. If the data arrives before the capture event, there is no undervoltage glitch. A rising edge 226 of the reference data signal 222 occurs before the event 230, thus there is no undervoltage event for the reference data signal 222. A rising edge 228 of the monitored data signal 224, however, occurs after the event 230, which indicates an undervoltage glitch. The circuits of FIGS. 1A and 1B can detect such undervoltage/overclocking glitches.

FIG. 3 illustrates, by way of example, graphs of voltage versus time for some TRC signals and a monitored signal that help explain fast clock glitch detection. A reference clock signal 330, reference data signal 332, and monitored clock signal 334 are illustrated in the graph of FIG. 3. An overclocking event occurs when the monitored clock signal 334 rises before the data signal 332. The TRC launch FF 110 starts timing at a rising edge of the reference clock signal 330 (indicated by event 336). The TRC capture FF 112 sets a time by which data is expected to arrive indicated by capture event 338. If the data arrives before the capture event, there is no overclocking glitch. A rising edge of the reference data signal 222 occurs before the event 338, thus there is no overclocking glitch for the reference data signal 222. A rising edge 228 of the monitored clock signal 334 (indicated by event 340), however, occurs before the rising edge 342 of the reference data signal 332, which indicates an overclocking glitch.

The TRC of FIGS. 1A and 1B can, without the aid of additional logic, detect the overclocking and undervoltage events described regarding FIGS. 2 and 3. The TRC of FIGS. 1A and 1B, however, does not detect overvoltage or underclocking events. These events are described regarding FIGS. 4 and 5, respectively.

Figure 4:
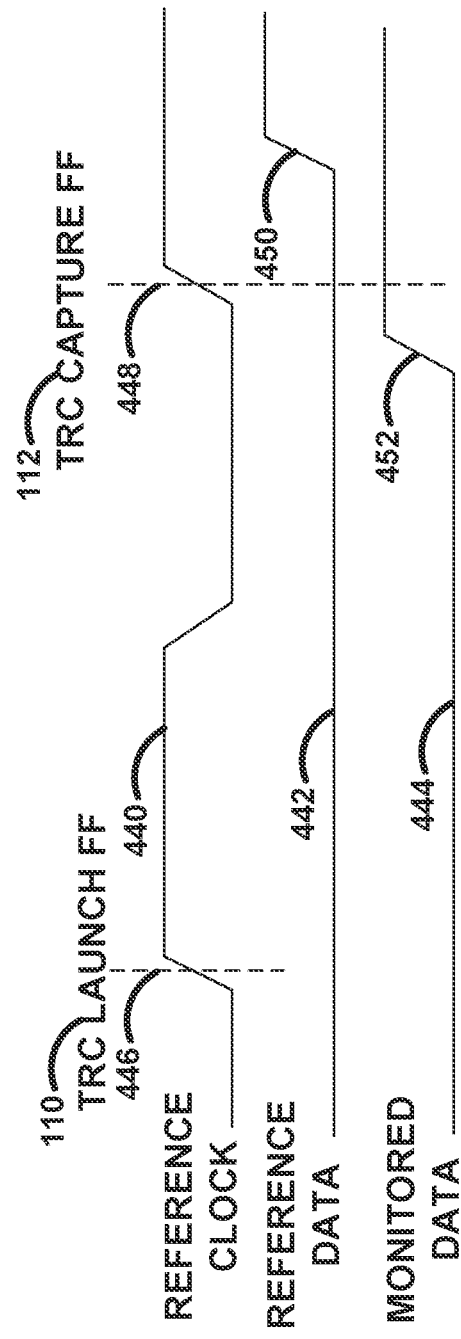
FIG. 4 illustrates, by way of example, a graph of voltage versus time for some TRC signals and a monitored signal that help explain overvoltage glitch detection.

FIG. 4 illustrates, by way of example, a graph of voltage versus time for some TRC signals and a monitored signal that help explain overvoltage glitch detection. A reference clock signal 440, reference data signal 442, and monitored data signal 444 are illustrated in the graph of FIG. 4. An overvoltage event occurs when the monitored data signal 444 precedes a reference clock signal 440 by more than a specified amount of time. A TRC launch FF 110 starts timing at a rising edge of the reference clock signal 440 (indicated by event 446). A TRC capture FF 112 sets a time which data is expected to arrive indicated by capture event 448. If the data arrives after the capture event 448, there is no overvoltage glitch. A rising edge 450 of the reference data signal 442 occurs after the event 448, thus there is no overvoltage event for the reference data signal 442. A rising edge 452 of the monitored data signal 444, however, occurs before the event 448, which indicates an overvoltage glitch.

Figure 5:
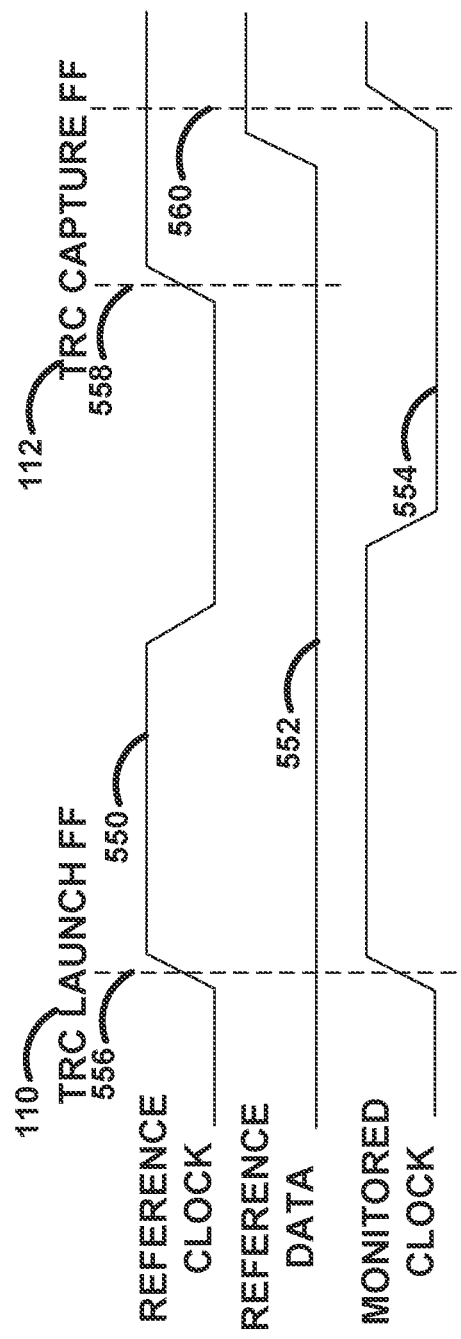
FIG. 5 illustrates, by way of example, graphs of voltage versus time for some TRC signals and a monitored signal that help explain slow clock (sometimes called "underclock") glitch detection.

FIG. 5 illustrates, by way of example, graphs of voltage versus time for some TRC signals and a monitored signal that help explain slow clock (sometimes called "underclock") glitch detection. A reference clock signal 550, reference data signal 552, and monitored clock signal 554 are illustrated in the graph of FIG. 5. An underclocking event occurs when the monitored clock signal 554 rises after the data signal 552. The TRC launch FF 110 starts timing at a rising edge of the reference dock signal 550 (indicated by event 556). The TRC capture FF 112 sets a time by which data is expected to arrive indicated by capture event 558. If the data arrives after the capture event 558, there is no underclocking glitch. A rising edge of the reference data signal 552 occurs after the event 558, thus there is no overclocking glitch for the reference data signal 552. A rising edge of the monitored dock signal 334 (indicated by event 560), however, occurs after the rising edge of the reference data signal 552, which indicates an underclocking glitch.

It is not trivial to use the TRC to detect an overvoltage/underclocking event. This is, at least in part, because the TRC is designed to detect undervoltage/overclocking events and the absence of an undervoltage/overclocking event does not always imply an overvoltage/underclocking event. This is because the operation could be normal.

To configure a TRC to detect an overvoltage/underclocking event, the TRC can be calibrated to indicate that operation is normal when an overvoltage/underclocking state is detected. Then, the output of that TRC can be inverted and provided to the security engine. Using this TRC, along with a TRC that is configured to detect an undervoltage/overclocking event, provides a low cost, small footprint (compared to an analog circuitry solution to detecting the overvoltage/underclocking and under-voltage/overclocking event), and configurable solution for broader glitch detection.

Figure 6:
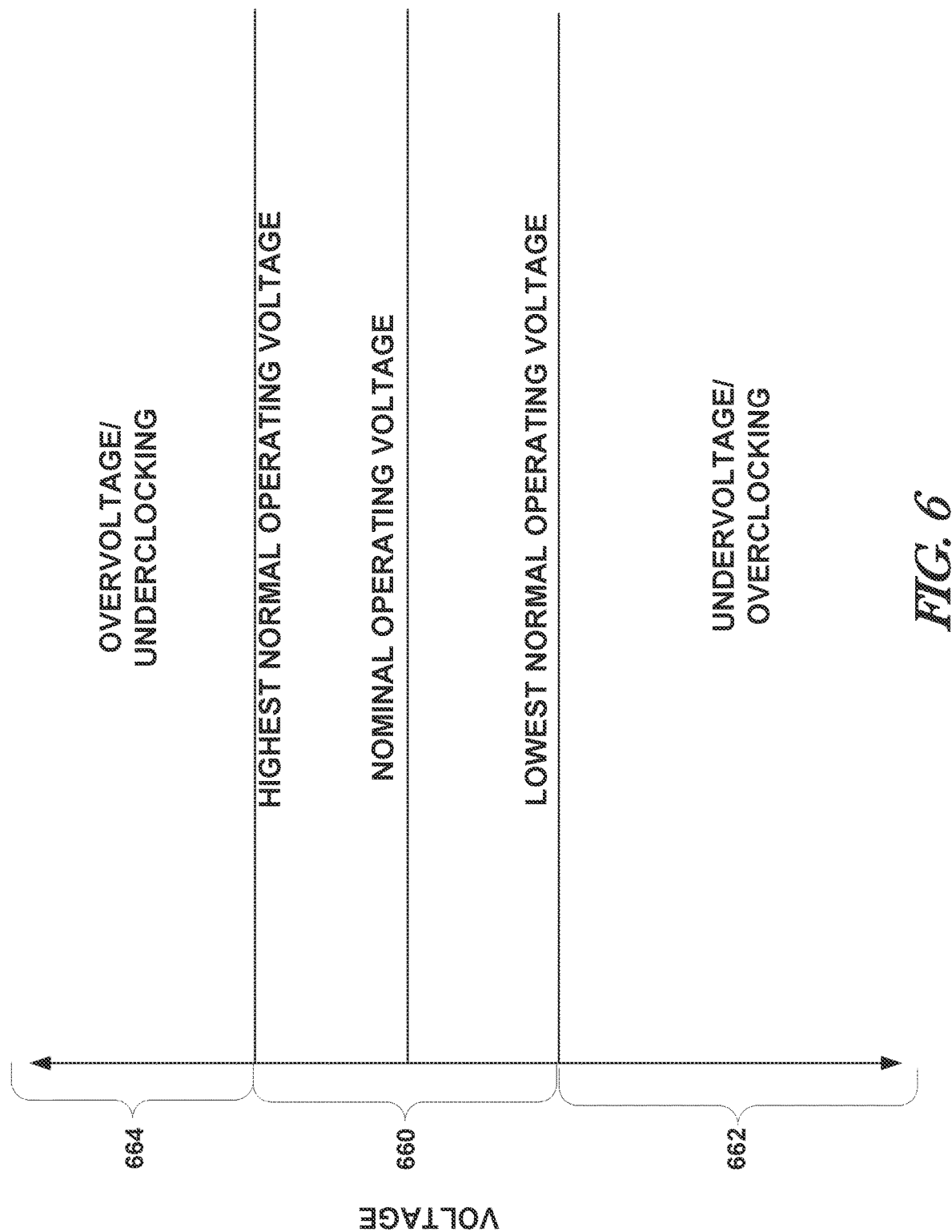
FIG. 6 illustrates, by way of example, a graph of voltage levels for a variety of operating states including an overvoltage/underclocking operation state, a nominal operating state, and an undervoltage/overclocking operating state.

FIG. 6 illustrates, by way of example, a graph of voltage levels for a variety of operating states including an overvoltage/underclocking operation state 664, a nominal operating state 660, and an undervoltage/overclocking operating state 662. When the voltage is within the normal operating state 660, the overvoltage/underclocking TRC provides an error signal, but that signal is inverted to indicate normal operation, and the undervoltage/overclocking TRC provides a signal indicating no error is detected. When the voltage is within the undervoltage/overclocking operating state 662, the overvoltage/underclocking TRC provides an error signal, but that signal is inverted to indicate normal operation, and the undervoltage/overclocking TRC provides a signal indicating an error is detected. When the voltage is within the overvoltage/underclocking operating state 664, the overvoltage/underclocking TRC provides a signal indicating that no error is detected, but that signal is inverted to indicate an error is detected, and the undervoltage/overclocking TRC provides a signal indicating no error is detected.

The voltage level changes a propagation delay in the circuit because a propagation delay of a transistor changes as the voltage changes. By increasing voltage, the propagation delay in transistors is reduced because with the increase in current from an increase in voltage (I=V/R), the gate capacitance of the transistor is charged faster and will lead to faster switching speeds. Conversely, the propagation delay in transistors is increased with a reduction in voltage because with the decrease in current from the decrease in voltage, the gate capacitance of the transistor is charged slower and will lead to slower switching speeds.

Figure 7:
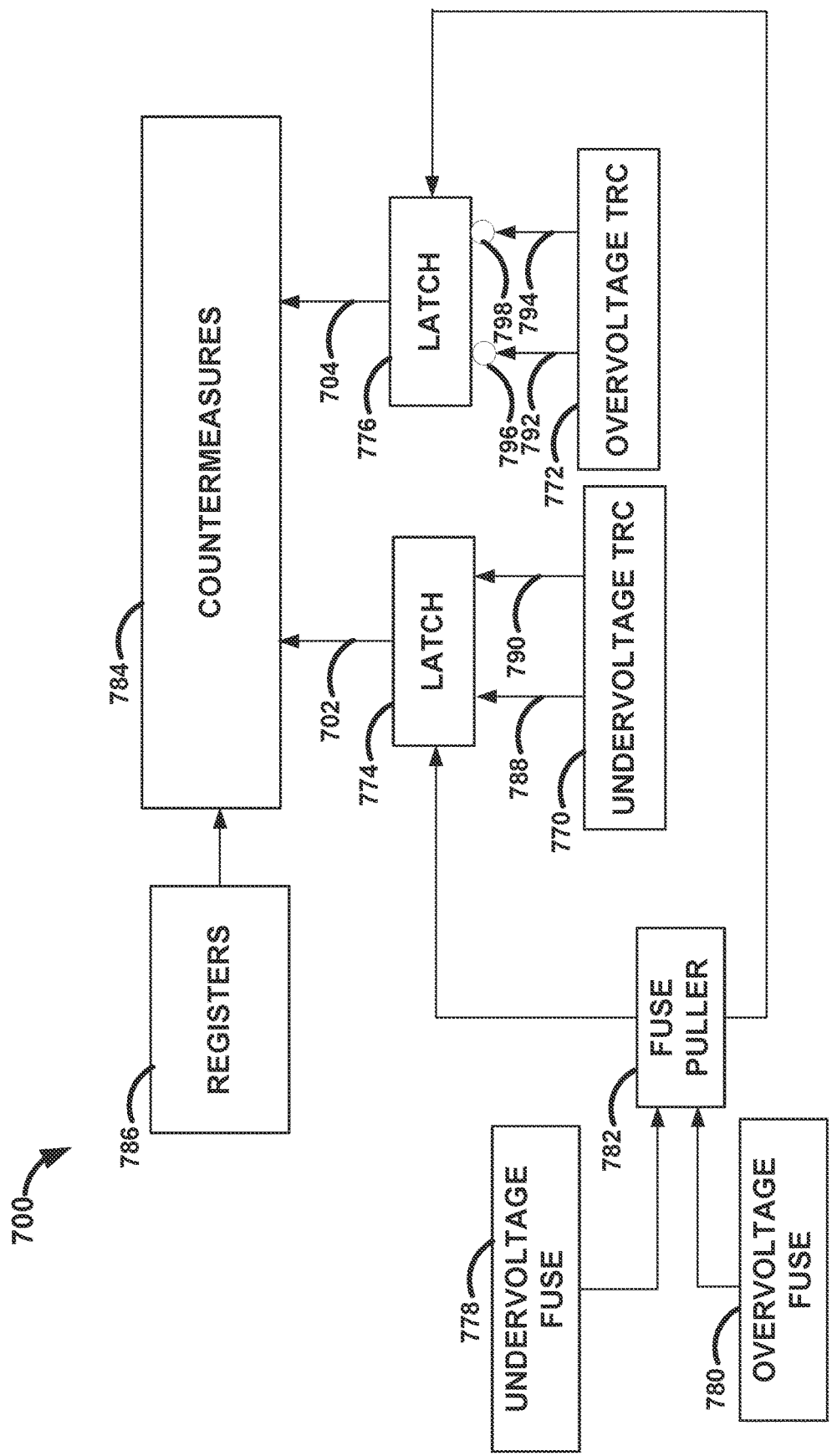
FIG. 7 illustrates, by way of example, a diagram of an embodiment of a system with overvoltage/underclocking and undervoltage/overclocking protection.

FIG. 7 illustrates, by way of example, a diagram of an embodiment of a system 700 with overvoltage/underclocking and undervoltage/overclocking protection. The system 700 as illustrated includes an undervoltage TRC 770, an overvoltage TRC 772, an undervoltage signal latch 774, an overvoltage signal latch 776, overvoltage fuse 778, undervoltage fuse 780, fuse puller 782, a countermeasures component, and registers 786.

The undervoltage TRC 770 is calibrated to provide an asserted error signal 788 if the voltage is determined to be in the undervoltage/overclocking operating state 662. The undervoltage TRC 770 is calibrated to provide an asserted valid signal 790 if the error signal 788 is ready for consideration by the countermeasures component 784. The error signal 788 and the valid signal 790 are latched by the latch 774.

The overvoltage TRC 772 is calibrated to provide an asserted error signal 792 if the voltage is determined to be in the undervoltage/overclocking operating state 662 or the normal operating state. The overvoltage TRC 772 is calibrated to provide an asserted valid signal 794 if the error signal 788 is ready for consideration by the countermeasures component 784. The error signal 792 is inverted, by inverter 796 and latched by the latch 776.

The latches 774, 776 are sometimes called flip flops (FFs). The latches 774, 776 have two stable states and can be used to store state information. An output signal 702 of the latch 774 is dependent on the input to the latch 774, the valid signal 790 and error signal 788 in the example of FIG. 7. If the error signal 788 is asserted, the output signal 702 is asserted on a next clock cycle if the valid signal is also asserted. If the error signal 788 is not asserted and the valid signal 790 is asserted, the output signal 702 is not asserted. Note that equivalent negative logic can be used.

An output signal 704 of the latch 776 is dependent on the input to the latch 776, the valid signal 792 and error signal 794 in the example of FIG. 7. If the error signal 792 is asserted, the output signal 704 is not asserted on a next clock cycle. If the error signal 792 is not asserted and the valid signal 794 is asserted, the output signal 704 is asserted on a next clock cycle. Note that equivalent negative logic can be used.

The overvoltage fuse 778 and the undervoltage fuse 780 store configuration data for the overvoltage TRC 772 and the undervoltage TRC 770, respectively. The configuration data can be hard coded, burned, or permanently stored in a readable memory component. The fuse puller 782 reads the data from the undervoltage fuse 778 and provides it to the latch 774. The fuse puller 782 reads the data from the overvoltage fuse 780 and provides it to the latch 776.

The registers 786 store readable and writable data for access by countermeasures component 784. The countermeasures component 784 performs operations that are circuit-based reactions to error conditions indicated by the overvoltage TRC 772 and the undervoltage TRC 770. The countermeasures component 784 can include hardware, software, firmware, or the like configured to alter one or more electric or electronic components to help mitigate effects of a detected overvoltage/underclocking event or undervoltage/overclocking event.

Example data that can be stored in the registers 786 or fuses 778, 780 include device-specific calibration information, configuration data such as polarity of the clock, whether to latch the data on the rising or falling edge of the clock, or the like.

Example actions that can be performed by the countermeasures component 784 include placing the device or SoC containing the TRC into reset, disabling a front side bus of a micro-processor containing a TRC, disabling data from entering or leaving the device or SoC containing the TRC, driving a signal external to the device or SoC to management controller, or the like.

The multiple TRCs 770, 772 can be implemented in a device including an integrated circuit (IC) in multiple ways:
1) Integrated inside one or more circuits (which are then integrated into a system on chip (SoC)) to exclusively protect the circuit in which the TRC is integrated from a glitch attack. In this context, a circuit could be an embedded security engine, CPU, graphics engine, power management engine, memory controller, I/O device such as a mass-storage controller, universal serial bus (USB) controller, or the like.
2) As an independent SoC device, dedicated to protecting multiple circuits within the SoC from a glitch attack.

Figure 8:
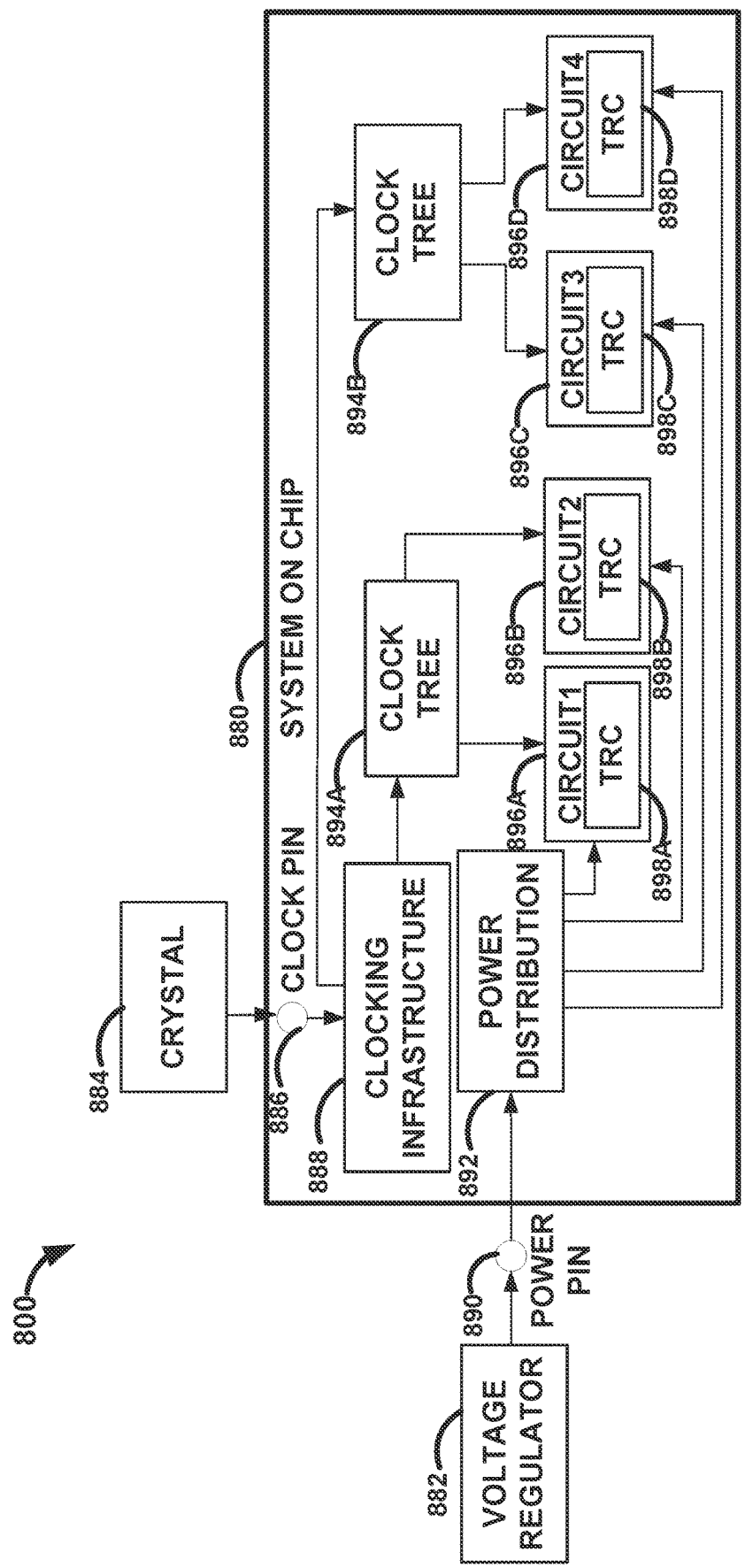
FIG. 8 illustrates, by way of example a diagram of an embodiment of an SoC that includes respective IRCs part of respective circuits.

FIG. 8 illustrates, by way of example a diagram of an embodiment of an SoC system 800 that includes respective TRCs 898A, 898B, 898C, 898D part of respective circuits 896A, 896B, 896C, 896D. The SoC system 800 includes an external crystal 884 that produces a clock signal that is provided to a clock pin 886. The crystal 884 could alternatively be internal to the SoC 880. The SoC system 800 includes an external voltage regulator 882 that provides electrical power to a power pin 890. The voltage regulator 882 could alternatively be situated internal to the SoC 880.

A clocking infrastructure 888 includes electric or electronic components configured to stabilize and adjust a frequency of the clock signal from the crystal 884. The clocking infrastructure 888 can provide a clock signal at a first frequency and amplitude to a first clock tree 894A. The clocking infrastructure 888 can provide a second clock signal at a second frequency and amplitude (possibly different from the first frequency and amplitude) to a second clock tree 894B. The clock tree 894 can include a clock buffer, jitter attenuator, clock generator, or the like configured to provide a clock with parameters (e.g., amplitude, frequency, shape, or the like) to one or more circuits 896A, 896B, 896C, 896D. The circuits 896A, 896B, 896C, 896D can include an embedded security engine, CPU, graphics engine, power management engine, memory controller, I/O device such as a mass-storage controller, USB controller, or the like.

The SoC 880 further includes a power distribution circuit 892 that conditions (e.g., alters amplitude, frequency, phase, magnitude, shape, or the like) the power from the power pin 890 to be compatible with corresponding circuits 896A, 896B, 896C, 896D. The power distribution circuit 892 can include electric or electronic components such as buffers, regulators, voltage or current sources, transformers, buck or boost converters, or the like.

Each of the TRC 898A, 898B, 898C, 898D includes an instance of the undervoltage TRC 770 and the overvoltage TRC 772, and other supporting component such as another component of the circuit 100 or system 700. The TRCs 898A, 898B, 898C, 898D protect respective circuits 896A, 896B, 896C, 896D from undervoltage/overclocking and overvoltage/underclocking events.

Figure 9:
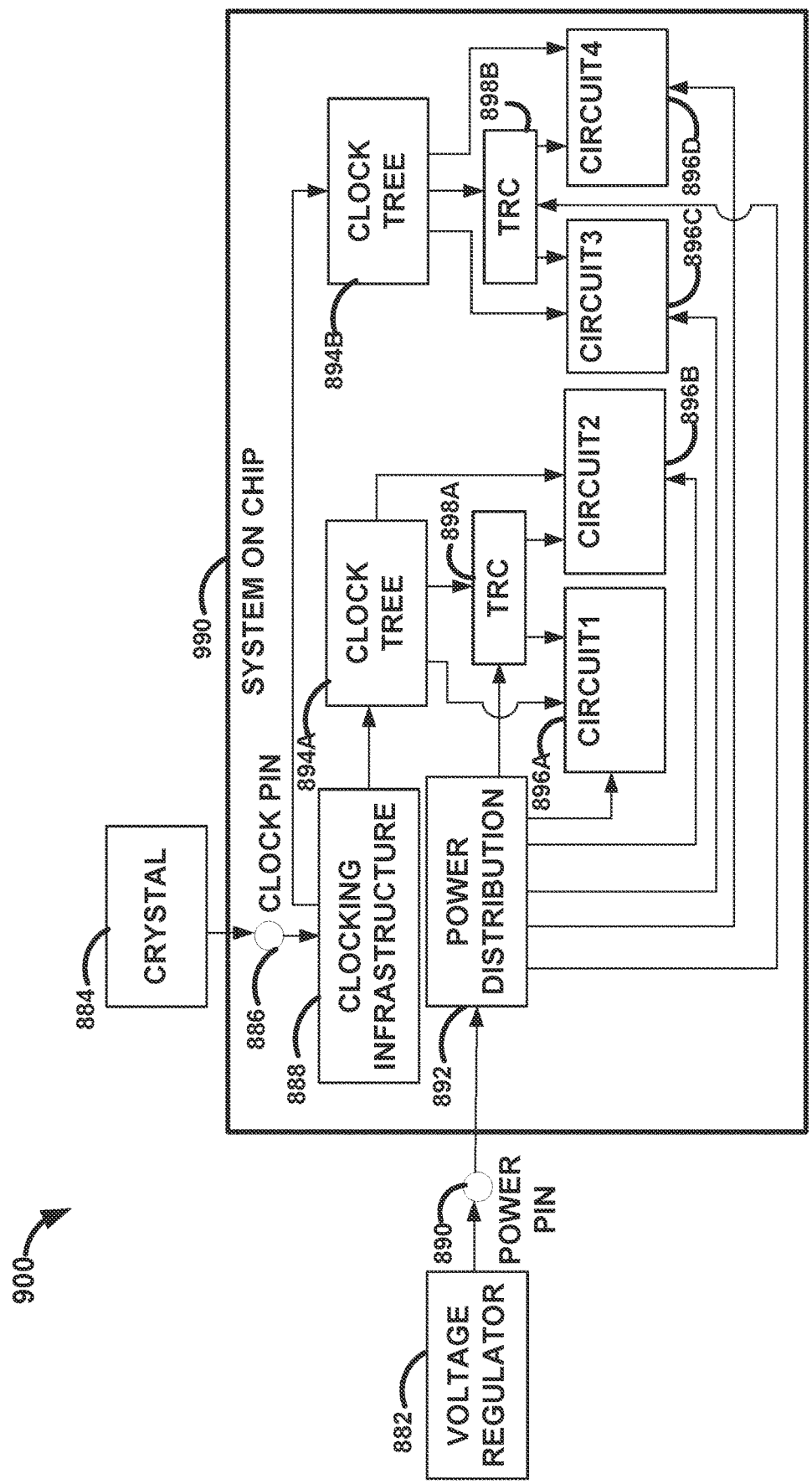
FIG. 9 illustrates, by way of example a diagram of an embodiment of an SoC that includes respective TRCs protecting circuits from external to the respective circuits.

FIG. 9 illustrates, by way of example a diagram of an embodiment of an SoC system 900 that includes respective TRCs 898A, 898B protecting circuits 896A, 896B, 896C, 896D from external to the respective circuits 896A, 896B, 896C, 896D. The SoC system 900 is similar to the SoC system 800 and includes many of the same components, with the SoC system 900 including an SoC 990 with fewer TRCs 898A, 898B. The TRCs 898A, 898B in FIG. 9 each protect multiple circuits 896A, 896B, 896C, 896D. The TRC 898A protects the circuits 896A, 896B. The TRC 898B protects the circuits 896C, 896D.

In each of FIGS. 8 and 9 there is an SoC with 4 circuits 896A, 896B, 896C, 896D. In FIG. 8 each circuit 896A, 896B, 896C, 896D contains its own TRC 898A, 898B, 898C, 898D. All 4 circuits 896A, 896B, 896C, 896D and all 4 respective TRCs are supplied respective same voltages. In FIG. 9 there are only 2 TRCs 898A, 898B. This optimization can be implemented because a single TRC 898A, 898B, 898C, 898D can protect all circuits 896A, 896B, 896C, 896D within an SoC system 800, 900 if those circuits 896A, 896B, 896C, 896D share the same clock and voltage source.

An advantage of the SoC system 800 is where protection of EM (electromagnetic radiation) attacks is a high priority. Due to the narrow focus of an EM beam, a TRC 898A, 898B, 898C, 898D best protects a circuit 896A, 896B, 896C, 898D from an EM attack if the TRC 898A, 898B, 898C, 898D is within the circuit 896A, 896B, 896C, 896D.

Figure 10:
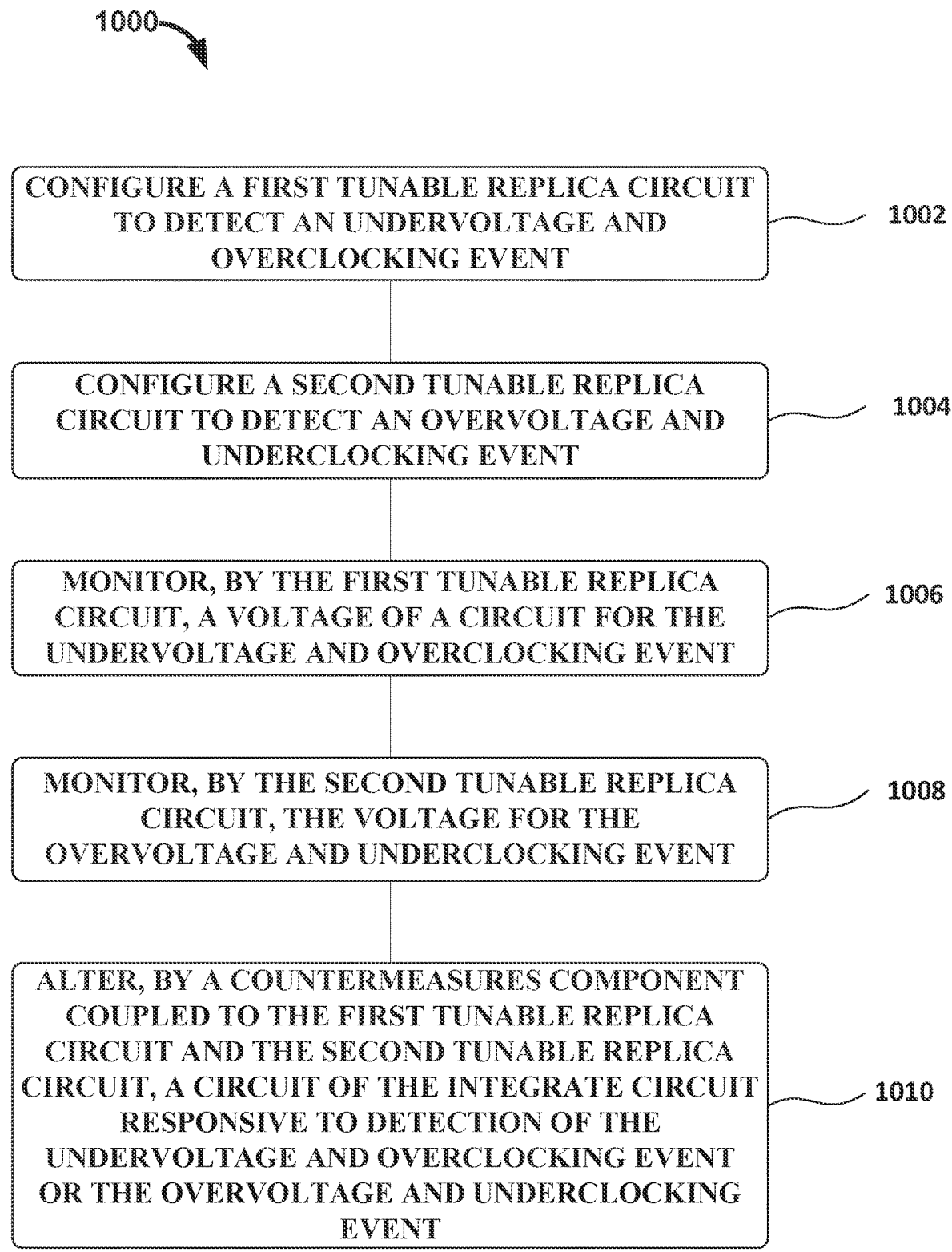
FIG. 10 illustrates, by way of example, a diagram of an embodiment of a method for circuit protection from undervoltage/overclocking and overvoltage/underclocking events.

FIG. 10 illustrates, by way of example, a diagram of an embodiment of a method 1000 for circuit protection from undervoltage/overclocking and overvoltage/underclocking events. The method 1000 as illustrated includes configuring a first tunable replica circuit to detect an undervoltage and overclocking event, at operation 1002; configuring a second tunable replica circuit to detect an overvoltage and underclocking event, at operation 1004; monitoring, by the first tunable replica circuit, a voltage of a circuit for the undervoltage and overclocking event, at operation 1006; monitoring, by the second tunable replica circuit, the voltage for the overvoltage and underclocking event, at operation 1008; and altering, by a countermeasures component coupled to the first tunable replica circuit and the second tunable replica circuit, a circuit of the integrate circuit responsive to detection of the undervoltage and overclocking event or the overvoltage and underclocking event, at operation 1010.

The method 1000 can further include calibrating the second tunable replica circuit to de-assert a first error signal when the overvoltage and underclocking event is detected. The method 1000 can further include inverting, by an inverter coupled between the second tunable replica circuit and the countermeasures component, the first error signal resulting in an inverted first error signal. The method 1000 can further include providing the inverted first error signal to the countermeasures component.

The method 1000 can further include calibrating the first tunable replica circuit to assert a second error signal when the undervoltage and overclocking event is detected. The method 1000 can further include providing the second error signal to the countermeasures component. The method 1000 can further include, wherein a latch is situated between the inverter and the countermeasures component, and the method further comprises configuring the second tunable replica circuit to assert a valid signal that, when asserted, indicates that data in the latch is ready for consideration by the countermeasures component.

The method 1000 can further include calibrating the second tunable replica circuit to assert the error signal responsive to detecting a normal operating voltage. The method 1000 can further include calibrating the first tunable replica circuit to assert the error signal responsive to an undervoltage and overclocking event. The method 1000 can further include configuring the first tunable replica circuit to replicate a normal delay in a data path in the circuit and the second tunable replica circuit to replicate a delay corresponding to the overvoltage and underclocking event.

Figure 11:
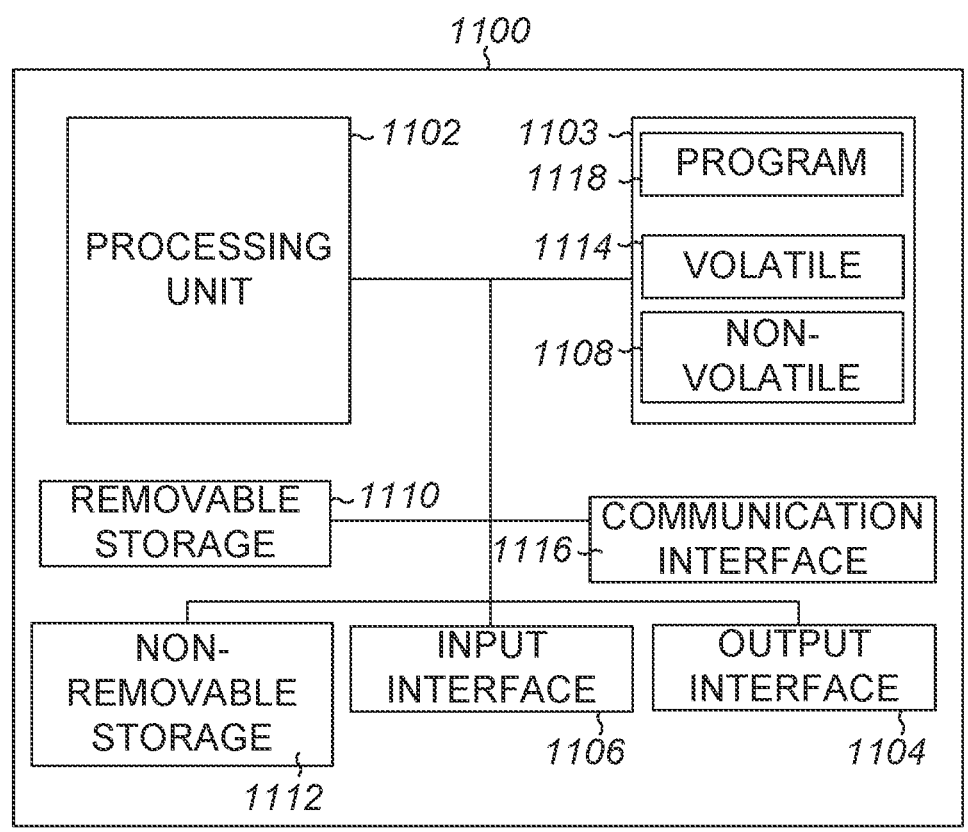
FIG. 11 illustrates, by way of example, a block diagram of an embodiment of a machine 1 (e.g., a computer system) to implement one or more embodiments of controller logic.

FIG. 11 illustrates, by way of example, a block diagram of an embodiment of a machine 1100 (e.g., a computer system) to implement one or more embodiments of controller logic. The machine 1100 can implement a technique for improved circuit attack protection. The countermeasures component 784, a component of the circuit 100, SoC system 800, 900 or a component thereof can include one or more of the components of the machine 1100. One or more of the countermeasures component 784, a component of the circuit 100, SoC system 800, 900, method 1000 or a component or operations thereof can be implemented, at least in part, using a component of the machine 1100. One example machine 1100 (in the form of a computer), may include a processing unit 1102, memory 1103, removable storage 1110, and non-removable storage 1112. Although the example computing device is illustrated and described as machine 1100, the computing device may be in different forms in different embodiments. Further, although the various data storage elements are illustrated as part of the machine 1100, the storage may also or alternatively include cloud-based storage accessible via a network, such as the Internet.

Memory 1103 may include volatile memory 1114 and non-volatile memory 1108. The machine 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1100 may include or have access to a computing environment that includes input 1106, output 1104, and a communication connection 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the machine 1100, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1102 (sometimes called processing circuitry) of the machine 1100. A hard drive, CD-ROM, and RAM are some examples of articles including a non-transitory computer-readable medium such as a storage device. For example, a computer program 1118 may be used to cause processing unit 1102 to perform one or more methods or algorithms described herein.

Note that the term "circuitry" as used herein refers to, is part of, or includes hardware components, such as transistors, resistors, capacitors, diodes, inductors, amplifiers, oscillators, switches, multiplexers, logic gates (e.g., AND, OR, XOR), power supplies, memories, or the like, such as can be configured in an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

ADDITIONAL NOTES AND EXAMPLES

Example 1 includes a device comprising a first tunable replica circuit configured to detect an undervoltage and overclocking event, a second tunable replica circuit configured to detect an overvoltage and underclocking event, and a countermeasures component configured to alter a circuit of the device responsive to detection of the undervoltage and overclocking event or the overvoltage and underclocking event.

In Example 2, Example 1 further includes, wherein the second tunable replica circuit is calibrated to de-assert a first error signal when the overvoltage and underclocking event is detected and the device further comprises an inverter to receive the first error signal and provide an inverted first error signal to the countermeasures component.

In Example 3, Example 2 further includes, wherein the first tunable replica circuit is calibrated to assert a second error signal when the undervoltage and overclocking event is detected and provide the second error signal to the countermeasures component.

In Example 4, at least one of Examples 2-3 further includes a latch situated between the inverter and the countermeasures component, and wherein the second tunable replica circuit is configured to assert a valid signal that, when asserted, indicates that data in the latch is ready for consideration by the countermeasures component.

In Example 5, at least one of Examples 2-4 further includes, wherein the second tunable replica circuit is calibrated to assert the error signal responsive to detecting a normal operating voltage.

In Example 6, Example 5 further includes, wherein the first tunable replica circuit is further calibrated to assert the error signal responsive to an undervoltage and overclocking event.

In Example 7, at least one of Examples 2-6 further includes a circuit, wherein the first tunable replica circuit replicates a normal delay in a data path in the circuit and the second tunable replica circuit replicates a delay corresponding to the overvoltage and underclocking event.

Example 8 includes a method comprising configuring a first tunable replica circuit to detect an undervoltage and overclocking event, configuring a second tunable replica circuit to detect an overvoltage and underclocking event, monitoring, by the first tunable replica circuit, a voltage of a circuit for the undervoltage and overclocking event, monitoring, by the second tunable replica circuit, the voltage for the overvoltage and underclocking event, and altering, by a countermeasures component coupled to the first tunable replica circuit and the second tunable replica circuit, a circuit of the integrate circuit responsive to detection of the undervoltage and overclocking event or the overvoltage and underclocking event.

In Example 9, Example 8 further includes calibrating the second tunable replica circuit to de-assert a first error signal when the overvoltage and underclocking event is detected, inverting, by an inverter coupled between the second tunable replica circuit and the countermeasures component, the first error signal resulting in an inverted first error signal, and providing the inverted first error signal to the countermeasures component.

In Example 10, Example 9 further includes calibrating the first tunable replica circuit to assert a second error signal when the undervoltage and overclocking event is detected, and providing the second error signal to the countermeasures component.

In Example 11, at least one of Examples 9-10 further includes, wherein a latch is situated between the inverter and the countermeasures component, and the method further comprises configuring the second tunable replica circuit to assert a valid signal that, when asserted, indicates that data in the latch is ready for consideration by the countermeasures component.

In Example 12, at least one of Examples 9-11 further includes calibrating the second tunable replica circuit to assert the error signal responsive to detecting a normal operating voltage.

In Example 13, Example 12 further includes calibrating the first tunable replica circuit to assert the error signal responsive to an undervoltage and overclocking event.

In Example 14, at least one of Examples 9-13 further includes configuring the first tunable replica circuit to replicate a normal delay in a data path in the circuit and the second tunable replica circuit to replicate a delay corresponding to the overvoltage and underclocking event.

Example 15 includes a system comprising a circuit, a first tunable replica circuit configured to detect an undervoltage and overclocking event of the circuit, the first tunable replica circuit replicates a normal delay in a data path in the circuit, a second tunable replica circuit in parallel with the first tunable replica circuit, the second tunable replica circuit configured to detect an overvoltage and underclocking event of the circuit, the second tunable replica circuit replicates a delay corresponding to the overvoltage and underclocking event, and a countermeasures component configured to alter the circuit responsive to detection of the undervoltage and overclocking event or the overvoltage and underclocking event.

In Example 16, Example 15 further includes, wherein the second tunable replica circuit is calibrated to de-assert a first error signal when the overvoltage and underclocking event is detected and the system further comprises an inverter to receive the first error signal and provide an inverted first error signal to the countermeasures component.

In Example 17, Example 16 further includes, wherein the first tunable replica circuit is calibrated to assert a second error signal when the undervoltage and overclocking event is detected and provide the second error signal to the countermeasures component.

In Example 18, at least one of Examples 16-17 further includes a latch situated between the inverter and the countermeasures component, and wherein the second tunable replica circuit is configured to assert a valid signal that, when asserted, indicates that data in the latch is ready for consideration by the countermeasures component.

In Example 19, at least one of Examples 15-18 further includes, wherein the first and second tunable replica circuits are part of the circuit.

In Example 20, at least one of Examples 15-19 further includes, wherein the first and second tunable replica circuits are external to the circuit.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device comprising:
   a first tunable replica circuit configured to detect an undervoltage and overclocking event;
   a second tunable replica circuit configured to detect an overvoltage and underclocking event; and
   a countermeasures component configured to alter a circuit of the device responsive to detection of the undervoltage and overclocking event or the overvoltage and underclocking event.

2. The device of claim 1, wherein the second tunable replica circuit is calibrated to de-assert a first error signal when the overvoltage and underclocking event is detected and the device further comprises an inverter to receive the first error signal and provide an inverted first error signal to the countermeasures component.

3. The device of claim 2, wherein the first tunable replica circuit is calibrated to assert a second error signal when the undervoltage and overclocking event is detected and provide the second error signal to the countermeasures component.

4. The device of claim 2, further comprising a latch situated between the inverter and the countermeasures component, and wherein the second tunable replica circuit is configured to assert a valid signal that, when asserted, indicates that data in the latch is ready for consideration by the countermeasures component.

5. The device of claim 2, wherein the second tunable replica circuit is calibrated to assert the error signal responsive to detecting a normal operating voltage.

6. The device of claim 5, wherein the first tunable replica circuit is further calibrated to assert the error signal responsive to an undervoltage and overclocking event.

7. The device of claim 2, further comprising a circuit, wherein the first tunable replica circuit replicates a normal delay in a data path in the circuit and the second tunable replica circuit replicates a delay corresponding to the overvoltage and underclocking event.

8. A method comprising:
   configuring a first tunable replica circuit to detect an undervoltage and overclocking event;
   configuring a second tunable replica circuit to detect an overvoltage and underclocking event;
   monitoring, by the first tunable replica circuit, a voltage of a circuit for the undervoltage and overclocking event;
   monitoring, by the second tunable replica circuit, the voltage for the overvoltage and underclocking event; and
   altering, by a countermeasures component coupled to the first tunable replica circuit and the second tunable replica circuit, a circuit of the integrate circuit responsive to detection of the undervoltage and overclocking event or the overvoltage and underclocking event.

9. The method of claim 8, further comprising:

calibrating the second tunable replica circuit to de-assert a first error signal when the overvoltage and underclocking event is detected;

inverting, by an inverter coupled between the second tunable replica circuit and the countermeasures component, the first error signal resulting in an inverted first error signal; and providing the inverted first error signal to the countermeasures component.

10. The method of claim 9, further comprising:

calibrating the first tunable replica circuit to assert a second error signal when the undervoltage and overclocking event is detected; and providing the second error signal to the countermeasures component.

11. The method of claim 9, wherein a latch is situated between the inverter and the countermeasures component, and the method further comprises configuring the second tunable replica circuit to assert a valid signal that, when asserted, indicates that data in the latch is ready for consideration by the countermeasures component.

12. The method of claim 9, further comprising calibrating the second tunable replica circuit to assert the error signal responsive to detecting a normal operating voltage.

13. The method of claim 12, further comprising calibrating the first tunable replica circuit to assert the error signal responsive to an undervoltage and overclocking event.

14. The method of claim 9, further comprising configuring the first tunable replica circuit to replicate a normal delay in a data path in the circuit and the second tunable replica circuit to replicate a delay corresponding to the overvoltage and underclocking event.

15. A system comprising:

a circuit;

a first tunable replica circuit configured to detect an undervoltage and overclocking event of the circuit, the first tunable replica circuit replicates a normal delay in a data path in the circuit;

a second tunable replica circuit in parallel with the first tunable replica circuit, the second tunable replica circuit configured to detect an overvoltage and underclocking event of the circuit, the second tunable replica circuit replicates a delay corresponding to the overvoltage and underclocking event; and a countermeasures component configured to alter the circuit responsive to detection of the undervoltage and overclocking event or the overvoltage and underclocking event.

16. The system of claim 15, wherein the second tunable replica circuit is calibrated to de-assert a first error signal when the overvoltage and underclocking event is detected and the system further comprises an inverter to receive the first error signal and provide an inverted first error signal to the countermeasures component.

17. The system of claim 16, wherein the first tunable replica circuit is calibrated to assert a second error signal when the undervoltage and overclocking event is detected and provide the second error signal to the countermeasures component.

18. The system of claim 16, further comprising a latch situated between the inverter and the countermeasures component, and wherein the second tunable replica circuit is configured to assert a valid signal that, when asserted, indicates that data in the latch is ready for consideration by the countermeasures component.

19. The system of claim 15, wherein the first and second tunable replica circuits are part of the circuit.

20. The system of claim 15, wherein the first and second tunable replica circuits are external to the circuit.

\* \* \* \* \*